US008151023B2

(12) United States Patent
Teicher

(10) Patent No.: US 8,151,023 B2

(45) Date of Patent: Apr. 3, 2012

(54) HYBRID STORAGE OF DOCUMENTS

(75) Inventor: Mordechai Teicher, Hod Hasharon (IL)

(73) Assignee: Sandisk IL Ltd., Kfar Saba (IL)

( * ) Notice: Subject to any disclaimer, the term of this patent is extended or adjusted under 35 U.S.C. 154(b) by 85 days.

(21) Appl. No.: 12/198,690

(22) Filed: Aug. 26, 2008

(65) Prior Publication Data

US 2010/0052306 A1 Mar. 4, 2010

(51) Int. Cl.
*G06F 13/00* (2006.01)

(52) U.S. Cl. ................................ 710/72; 710/73; 710/74

(58) Field of Classification Search ........................ 710/2
See application file for complete search history.

(56) References Cited

U.S. PATENT DOCUMENTS

| | | | | |
|---|---|---|---|---|
| 5,520,544 | A * | 5/1996 | Manico et al. | 434/317 |
| 5,876,144 | A * | 3/1999 | Bedol et al. | 402/4 |
| 6,017,062 | A * | 1/2000 | White | 281/29 |
| 6,167,233 | A * | 12/2000 | Gresser et al. | 434/308 |
| 6,420,215 | B1 | 7/2002 | Knall et al. | |
| 6,486,065 | B2 | 11/2002 | Vyvoda et al. | |
| 6,513,836 | B2 * | 2/2003 | Li | 281/22 |
| 6,525,953 | B1 | 2/2003 | Johnson | |
| 6,541,312 | B2 | 4/2003 | Cleeves et al. | |
| 6,591,526 | B1 * | 7/2003 | Garrett | 40/455 |
| 6,608,618 | B2 * | 8/2003 | Wood et al. | 345/173 |
| 6,660,119 | B2 * | 12/2003 | Allen et al. | 156/226 |
| 6,664,639 | B2 | 12/2003 | Cleeves | |
| 6,668,156 | B2 * | 12/2003 | Lynch et al. | 434/317 |
| 6,704,235 | B2 | 3/2004 | Knall et al. | |
| 6,853,049 | B2 | 2/2005 | Herner | |
| 6,854,915 | B1 * | 2/2005 | Ong | 402/3 |
| 6,954,199 | B2 * | 10/2005 | Soto et al. | 345/173 |
| 7,027,172 | B1 * | 4/2006 | Parulski et al. | 358/1.15 |
| 7,039,355 | B2 * | 5/2006 | Lynch et al. | 434/317 |
| 7,120,385 | B2 * | 10/2006 | Marggraff | 434/317 |

(Continued)

FOREIGN PATENT DOCUMENTS

GB 2453968 A * 4/2009

(Continued)

OTHER PUBLICATIONS

Innova Editions, "Bookbound Memo Album", date unknown, Weybridge, Surrey, pp. 22-23.*

(Continued)

*Primary Examiner* — Cheng-Yuan Tseng
(74) *Attorney, Agent, or Firm* — Jenkins, Wilson, Taylor & Hunt, P.A.

(57) ABSTRACT

A hybrid storage apparatus for retaining printed content and storing digital content includes a loose-leaf binder configured to retain printed pages containing printed content, and a storage device that is fixedly attached to the loose-leaf binder. The storage device includes a socket port detachably connect to a cable, and a non-volatile memory coupled to the socket port and configured for storing digital content. The cable is separate from the hybrid storage apparatus and used for communicating with a host. Also provided is a hybrid storage apparatus for holding print media and for storing digital content that includes a plurality of pages containing printed content, a cover for retaining the pages, and a storage device that is fixedly attached to or embedded within the cover. The pages include at least one page that displays a table of contents and refers to the digital content items stored in the non-volatile memory.

15 Claims, 4 Drawing Sheets

U.S. PATENT DOCUMENTS

| | | | | |
|---|---|---|---|---|
| 7,120,386 | B1 * | 10/2006 | Lynch et al. | 434/317 |
| 7,139,523 | B1 * | 11/2006 | Lynch et al. | 434/317 |
| 7,142,115 | B2 | 11/2006 | Waters | |
| 7,386,804 | B2 * | 6/2008 | Ho et al. | 715/776 |
| 7,411,578 | B2 * | 8/2008 | Shuhami | 345/156 |
| 7,525,680 | B2 * | 4/2009 | Berarducci et al. | 358/1.15 |
| 7,614,837 | B2 * | 11/2009 | Anderson et al. | 412/1 |
| 7,802,386 | B2 * | 9/2010 | Mandelbaum et al. | 40/124.03 |
| 7,855,810 | B2 * | 12/2010 | Manico et al. | 358/3.28 |
| 2002/0067037 | A1 * | 6/2002 | Lo | 281/15.1 |
| 2002/0186402 | A1 * | 12/2002 | Jackson et al. | 358/1.15 |
| 2003/0214779 | A1 * | 11/2003 | Socolofsky | 361/683 |
| 2004/0039750 | A1 * | 2/2004 | Anderson et al. | 707/103 R |
| 2004/0086840 | A1 * | 5/2004 | Redford et al. | 434/307 R |
| 2004/0099743 | A1 | 5/2004 | Waters | |
| 2004/0104890 | A1 * | 6/2004 | Caldwell et al. | 345/156 |
| 2005/0072692 | A1 * | 4/2005 | Fu et al. | 206/308 |
| 2005/0095568 | A1 * | 5/2005 | Musolf et al. | 434/308 |
| 2005/0208458 | A1 * | 9/2005 | Smith et al. | 434/128 |
| 2006/0172273 | A1 * | 8/2006 | Heffernan et al. | 434/315 |
| 2006/0261592 | A1 * | 11/2006 | O'Keefe | 281/22 |
| 2007/0048079 | A1 * | 3/2007 | Ng | 402/70 |
| 2007/0133055 | A1 * | 6/2007 | Johnson | 358/1.18 |
| 2007/0154876 | A1 * | 7/2007 | Harrison | 434/365 |
| 2008/0005420 | A1 * | 1/2008 | Spector et al. | 710/62 |
| 2008/0030815 | A1 * | 2/2008 | Teicher et al. | 358/527 |
| 2008/0046829 | A1 * | 2/2008 | Leong | 715/764 |
| 2008/0273917 | A1 * | 11/2008 | Beuselinck et al. | 402/75 |
| 2009/0096743 | A1 * | 4/2009 | DalPorto et al. | 345/104 |
| 2009/0170371 | A1 * | 7/2009 | Bedol | 439/607.01 |
| 2009/0231233 | A1 * | 9/2009 | Liberatore | 345/1.3 |

FOREIGN PATENT DOCUMENTS

GB 2453969 A * 4/2009

OTHER PUBLICATIONS

Universal Serial Bus Specification rev. 2.0, 2000, pp. 23, 85.*
"Memory Spot Chip," HP, Palo Alto, California, pp. 1-2 (Jul. 17, 2006).
"Bookbound Memo Album," Innova Editions, Weybridge, Surrey, pp. 1-2 (Publication Date Unknown).

* cited by examiner

HYBRID STORAGE OF DOCUMENTS

FIELD OF THE INVENTION

The present invention relates generally to storing and archiving of documents, and in particular to storing and archiving documents in both digital and visual forms.

BACKGROUND

Many documents can exist in either digital or visual form, or in both forms. Documents are often filed or archived by theme and/or time period. For example, a theme of a wedding may be documented by a visual photo album plus a collection of digital photos and video clips that is stored on a computer hard disk drive or on a digital optical medium. In the office environment, a binder titled "Customer XXX—year YYY" may contain paper documents, while an office server stores emails and electronic documents related to the same customer and time period.

Digital cameras capture pictures digitally, and often such digital pictures are printed and thus converted to visual form. Similarly, letters and contracts are typed using a word processing application and are saved in digital form, with a printed copy providing a corresponding visual version. Also, conversely, some drawings are sketched by hand on paper in visual form, and are then scanned and digitally stored.

Separate storage or archival of electronic and paper forms of related documents is easily and seamlessly managed in the short term, but may become a problem as time goes by. After two, five or ten years, the paper version will often survive in tangible visual form, while the electronic counterpart may get lost or become hard to find.

Responding to the need to keep together visual documents and related digital counterparts, some vendors are offering document binders that include a CD pocket, and the user is encouraged to keep in such albums or binders both paper and electronic copies of related documents. However, accessing electronic copies on a CD/DVD requires a CD/DVD drive, which many notebook computers no longer include. Moreover, a CD or DVD disk must be removed from its corresponding photo album or document folder for reading, and then may be easily misplaced and lost, which may be noticed only years later when searching for a digital document. Furthermore, the longevity of data burned onto CDs and DVDs varies greatly, depending on the quality of the media, burner and storage conditions, and often data will not survive for as long as the anticipated period of time.

SUMMARY

In view of the foregoing observations and the present needs, it would be advantageous to have a loose-leaf binder, and/or a photo book that includes a cover, with a storage device for retaining printed content and storing digital content, where the storage device is embedded within or fixedly attached to the binder and is adapted for communicating with a host via a cable.

Embodiments, various examples of which are discussed herein, include a hybrid storage apparatus for retaining printed content and storing digital content, where the hybrid storage apparatus includes a loose-leaf binder that is configured to retain printed pages containing printed content and a storage device that is fixedly attached to the loose-leaf binder. The storage device includes a socket port that is configured to detachably connect to a cable, and a non-volatile memory coupled to the socket port and configured for storing digital content. The cable is separate from the hybrid storage apparatus and used for communicating with a host, and The non-volatile memory may be a solid-state memory, utilizing flash memory technology and/or anti-fuse memory technology for example, and the socket port may typically be a USB female connector.

According to another embodiment, a hybrid storage apparatus for holding print media and for storing digital content includes a plurality of pages containing printed content, a cover for retaining the plurality of pages, and a storage device that is fixedly attached to or embedded within the cover. Again, the storage device includes a socket port that is configured be detachably connected with a cable, and a non-volatile memory coupled to the socket port and storing a plurality of digital content items. The cable is separate from the hybrid storage apparatus and is used for communicating with a host. The pages include at least one page displaying a table of contents that refer to the digital content items stored in the non-volatile memory.

The digital content items may include digital pictures, and the table of contents may include thumbnails referring to the digital pictures. The digital content items may also include at least one video, and the table of contents includes at least one storyboard referring to each of said at least one video.

The non-volatile memory may be a solid-state memory, utilizing flash memory technology and/or anti-fuse memory technology for example, and the socket port may be a USB female connector.

Additional features and advantages of the embodiments described are possible as will become apparent from the following drawings and description.

BRIEF DESCRIPTION OF THE DRAWINGS

For a better understanding of the various embodiments, reference is made to the accompanying drawings, in which like numerals designate corresponding sections or elements throughout, and in which.

DETAILED DESCRIPTION

The embodiments and various aspects thereof are further described in more details below. This description is not intended to limit the scope of claims but instead to provide examples of such embodiments. The following discussion therefore presents exemplary embodiments. One such embodiment includes a loose-leaf binder with a storage device for retaining printed content and storing digital content. The storage device is embedded within or fixedly attached to the binder and is adapted for communicating with a host via a cable.

Another embodiment might be a photo book that includes a cover for retaining pages with printed material. The storage device is embedded within or fixedly attached to the cover. While the binder can retain pages that are not part of the binder, the photo book retains pages that are part of the photo book.

It should be noted that 'pages' (or 'printed pages' or 'print media') is not necessarily only machine printed paper and it could include hand-prints, paintings or a combination thereof.

The digital contents may be written onto the storage device by a user (for example, for the purpose of filing and archiving), by a machine, or by a service facility, such as a service facility that prints and binds photo books. Digital content may be one-time or multi-time programmable onto the storage device.

Figure 1:
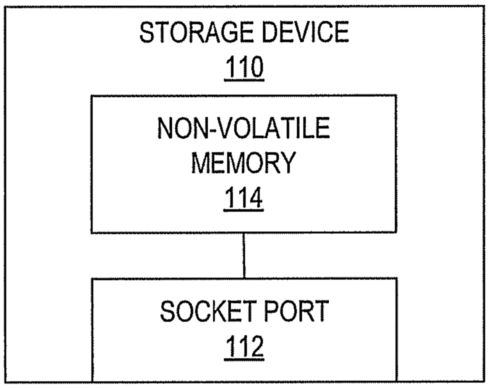
FIG. 1 is a block diagram of a storage device, according to an exemplary embodiment.

FIG. 1 is a block diagram of a storage device 110, according to one embodiment. Storage device 110 is fixedly attached to a binder, such as loose-leaf binder 100 of FIG. 2. Loose-leaf binder 100 may be a two-ring binder, a three-ring binder, among others.

Storage device 110 includes a socket port 112 (such as a female USB socket) for allowing one-time/multi-time programming of data onto non-volatile memory 114, reading of data that is stored on a non-volatile memory 114 and/or other communication capabilities via a cable connection with a host.

The storage technology employed by non-volatile memory 114 may vary according to utility and cost considerations. For example, when a couple of years of data retention is sufficient, flash memory technology may be used. On the other hand, for long-term archiving, a long-lasting storage technology, such as anti-fuse memory technology, is used.

A long-lasting storage technology may be a digital storage technology that is designed to preserve data for as many as 20 years or even more. An exemplary long-lasting storage technology is commercially available from SanDisk Corporation of Milpitas, Calif., the assignee of the present patent application, and is based on silicon dioxide anti-fuse, taught and described in numerous patents, including, for example, U.S. Pat. Nos. 6,420,215; 6,486,065; 6,525,953; 6,541,312; 6,664,639; 6,704,235; and 6,853,049 that are incorporated by reference as if set forth fully herein. These patents relate to anti-fuse memory cell devices and provide improved methods of fabrication, which are used to assist in programming an anti-fuse layer and to thereby enhance anti-fuse performance.

Anti-fuse devices are used in write once non-volatile memories. An anti-fuse device typically contains an insulating anti-fuse layer between two metal or semiconductor layers. When a programming voltage is applied across the anti-fuse layer, a conductive link is formed between the metal or semiconductor layers to provide a conductive path between these layers. It is desirable to form anti-fuse devices with high quality anti-fuse layers to improve device reliability.

Storage device 110 is fixedly attached within loose-leaf binder 100. The content digitally stored on non-volatile memory 114 and the content visually displayed on the pages of paper within the corresponding volume 100 may be at least partly related.

Socket port 112 is preferably a female connector that may utilize any communication protocol known to those skilled in the art in communication with a host via a cable, including a USB female connector, a SATA (Serial Advanced Technology Attachment) port connection that is based on serial signaling technology, a PCI Express port connection, a FireWire port connection, an MMC memory card format port connection, an SD memory card format port connection, and a memory stick port connection among others.

Figure 2:
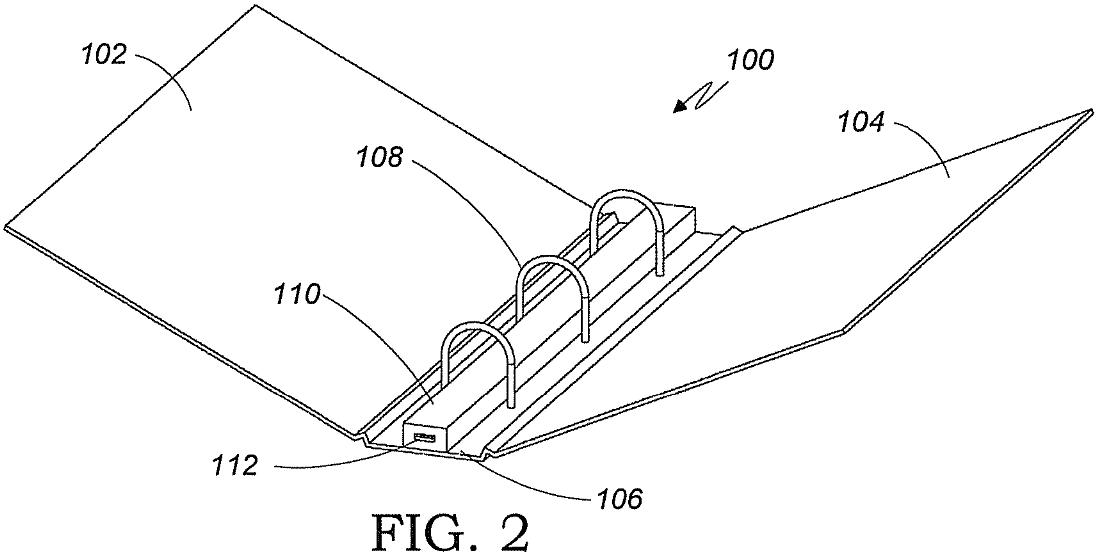
FIG. 2 is a schematic illustration of a binder, for retaining printed content and storing digital content, according to an exemplary embodiment.

FIG. 2 is a schematic illustration of a binder, such as a loose-leaf binder 100, for retaining printed content and storing digital content, according to one embodiment. FIG. 2 is described in association with storage device 110 of FIG. 1. Loose-leaf binder 100 includes a front cover 102, a back cover 104, a spine 106, and a plurality of rings 108. Rings 108 are adapted for selectably receiving, holding and releasing punched pages of paper or similar material. Alternatively, the pages may be retained by spring-loaded clamps, or any other technique known in the art for filing and archiving paper documents.

The pages held in loose-leaf binder 100 contain printed documents, containing text, graphics and/or photos.

In this example, a storage device 110 is fixedly attached to spine 106 of loose-leaf binder 100, or anywhere else within loose-leaf binder 100. Such attachment can be made by well known affixing techniques such as gluing, stapling or riveting.

Storage device 110 includes non-volatile memory 114 (see FIG. 1; not shown in FIG. 2) and a socket port 112. Socket port 112 is devised to connect non-volatile memory 114 with a host (not shown) via a cable (not shown) that is separate from loose leaf binder 100, for read and/or write operations. Socket port 112 may communicate with a host over a wired (rather than a wireless) communication channel by use of a cable that is external to loose-leaf binder 100.

Figure 3A:
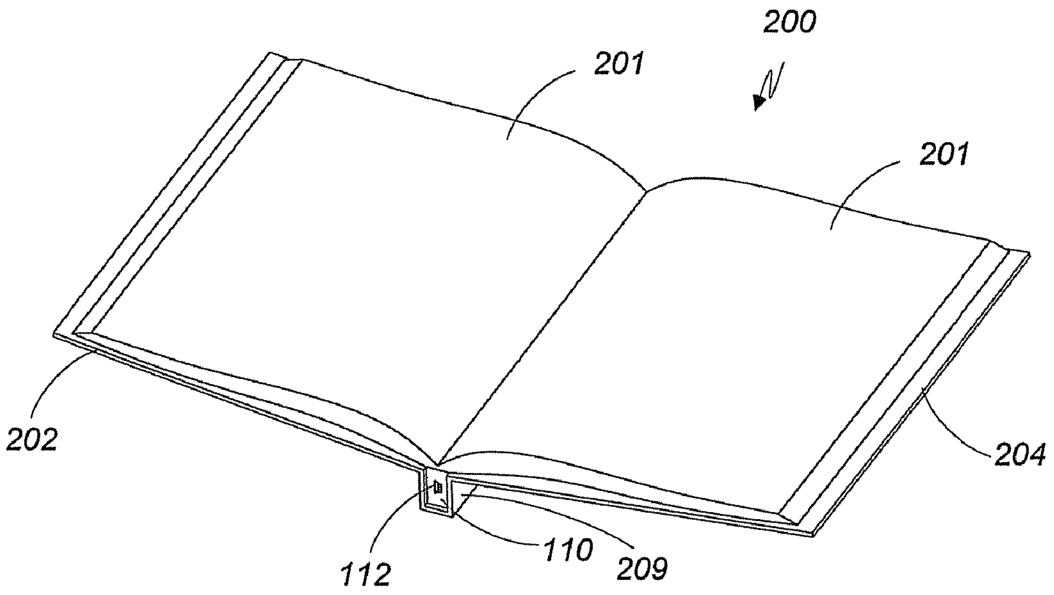
FIG. 3A is a schematic illustration of a photo book for holding print media and storing digital content, according to another exemplary embodiment.

FIG. 3A is a schematic illustration of a photo book 200, for holding print media and storing digital content, according to another embodiment. FIG. 3A is described in accordance with storage device 110 of FIG. 1. Photo book 200 includes a front cover 202 and a back cover 204 for retaining pages 201 containing printed material, and a spine 209 forming part of photo book 200.

Storage device 110 is fixedly attached to and embedded within spine 209 of photo book 200, and is detachably connected via socket port 112 with a cable (not shown) that is separate from photo book 200, for interfacing non-volatile memory 114 (not shown) with a host (not shown) for read/write operations. Alternatively, storage device 110 may be fixedly attached to the front or back cover of photo book 200. Such fixed attachment can be made by laminating two layers of cover with storage device 110 inserted in the space between them before such lamination, for example, by inserting storage device 110 between two thin cupboard sheets and gluing them for forming front cover 202, by casting a plastic material around storage device 110 to form front cover 202, or by gluing, stapling or riveting storage device 110 to any other part of photo book 200.

Pages 201 held in photo book 200 may contain printouts of pictures of larger sizes, such as one, two, four or six pictures per page, for convenient and pleasant viewing of the pictures. Among other printed information, pages 201 may contain a visual table of content (TOC) representing the content of storage device 110. In the context of this description, a "table of contents" may be a collection of visual metadata (i.e., information about a document) corresponding to and representative of collection of digital content.

The table of contents may include thumbnails of all digital pictures stored in non-volatile memory 114 of storage device 110. In the context of this description, a thumbnail is often a small version of the picture that identifies the picture content to the user yet is too small for enjoyable viewing experience. The table of contents may include a storyboard for each video stored in non-volatile memory 114. A story board typically contains a collection of printed frames, representing a video movie for example.

Typically, the content (other than the table of contents) visually displayed on pages 201 and the content digitally stored on non-volatile memory 114 is (at least partially) related.

In an example of photo book 200 that is a wedding photo book, the pages may display selected photos and captions, while non-volatile memory 114 stores the digital version of the selected photos, other photos that are not selected for printing, videos, greeting letters received by email, and soundtracks that were used during the ceremony, among others. A table of content associated with the content stored on non-volatile memory 114 is printed in the form of image thumbnails, video story boards, and document tiles and abstracts, and may be presented as a separate section of pages 121.

The exemplary binder and/or photo book discussed herein above may be adapted for conventional storage on shelves and in cabinets in the office or at home. In this case, each apparatus may be accessed and/or removed from the respective shelf or cabinet for viewing its visual content or for connecting to a computer (via a cable) and accessing the digital content.

Figure 3B:
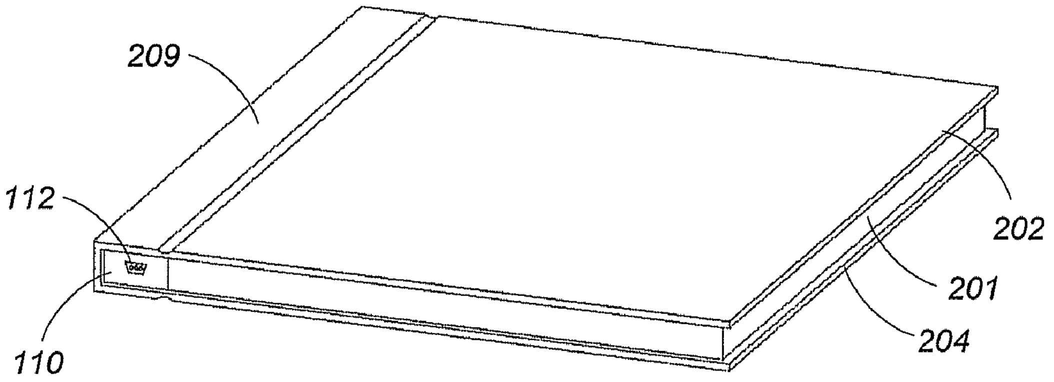
FIG. 3B shows the photo book of FIG. 3A in closed position.

FIG. 3B shows photo album 200 of FIG. 3A in closed position, ready to be stored on a shelf or in a cabinet.

Figure 4:
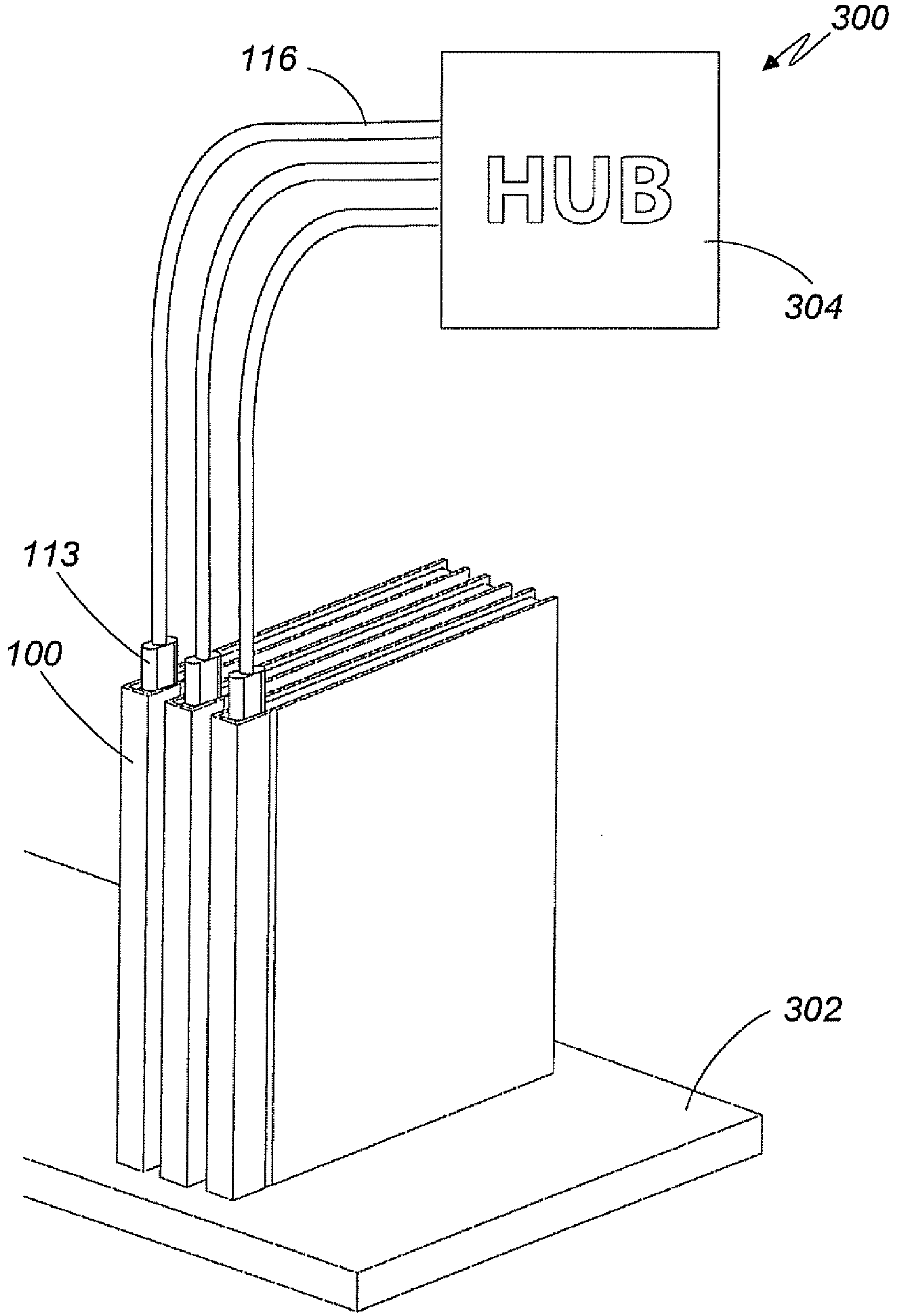
FIG. 4 shows a schematic illustration of a storage arrangement, according to an exemplary embodiment.

FIG. 4 shows a schematic illustration of a storage arrangement 300, according to an exemplary embodiment. FIG. 4 is described in association with FIG. 2, for placing a plurality of loose-leaf binders 100 on a shelf 302. Each loose-leaf binder 100 is connected to a hub 304 via a male connector 113 (that interfaces with socket port 112 according to the USB protocol for example) and a cable 116. Cable 116, having a matching plug 113 to that of socket port 112 is detachably connected to socket port 112 and is separate from loose-leaf binder 100.

Hub 304 can then be connected (permanently, or as needed) to a host, such as a personal computer (PC) for selectively accessing the digital content stored in any of loose-leaf binders 100. In this way, the digital content stored on loose-leaf binder 100 can be readily accessed from a computer without the need for removal of loose-leaf binder 100 from the shelf or cabinet. Additionally or alternatively, storage arrangement 300 may accommodate one or more photo books 200 of FIGS. 3A-B, which are selectively accessible from a host via hub 304.

Figure 5:
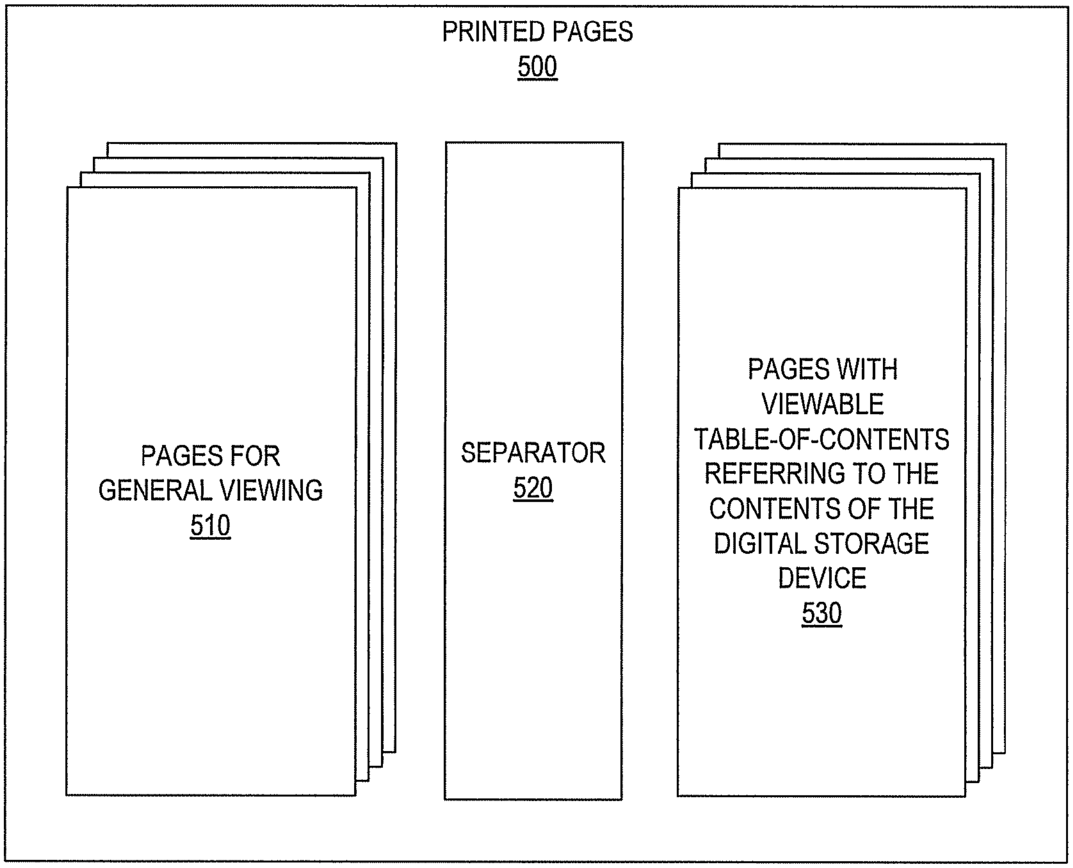
FIG. 5 is a schematic block diagram illustrating the visual contents stored in a photo book, according to an exemplary embodiment.

FIG. 5 illustrates the visual contents stored in a photo book, according to an exemplary embodiment. FIG. 5 is described in association with photo book 200 of FIG. 3A.

Pages for general viewing 510 include one or more pages showing pictures, captions, printed letters etc., provided for convenient and attractive viewing and reading. These are similar or even identical in their purpose and format to the printed pages in conventional photo books. Pages 530 include one or more pages displaying a viewable table of contents referring to the content stored on storage device 110 of FIG. 3A. Again, the table of contents enables a user to conveniently identify which items of digital content are available within storage device 110 in order to consider connecting photo book 200 to a computer for accessing such items. Digital pictures may be represented within the table of content of pages 530 by thumbnails, videos may be represented by story boards, and letters, emails and other documents may be represented by bibliographic data such as title, author, date and/or abstract.

A separator 520 may optionally be provided for separating between pages 510 and pages 520, allowing the user interested in the digital contents of storage device 110 to conveniently access the respective table of contents on pages 530. Separator 520 is typically a page made up of heavier stock and/or distinguished by color.

A storage device with which such apparatus is used may be any storage device known in the art that is operative to connect to and communicate with a host, typically by use of an external cable. The storage device may include an array of one or more memory components (such as FLASH) having the capacity to store data in binary form in a non-volatile manner. Note that having FLASH type memory components is not meant as a limitation, as other embodiments using any appropriate type of memory technology are further applicable.

Again, the storage technology employed by non-volatile memory 114 of FIG. 1 may vary according to utility and cost considerations. For example, when a loose-leaf binder 100 of FIG. 2 is used for frequent filing and a couple of years of data retention is sufficient, flash memory technology may be used. On the other hand, if binder 100 is used for long-term archiving, or a photo book 200 is created to preserve digital memories for generations, a long-lasting storage technology is typically used.

The storage device may be configured as a solid state disk drive. The storage device may communicate with hosts via USB or other communication protocols.

The storage device discussed herein includes solid state drives, and may have a configuration that complies with a USB flash drive (UFD) or other communication protocols. The storage device may be implemented with a one-time programmable (OTP) or multi-time programmable memory device and/or with OTP (one-time programmable) anti-fuse storage technology that offers data retention for decades and even centuries. One supplier of such memory devices is SanDisk® Corporation of Milpitas, Calif., assignee of this application.

The storage device may employ non-volatile memory that retains its content even when power is absent. A non-volatile memory may be based on erasable programmable memory technologies, including but not-limited to electrically-erasable and programmable read-only memories (EEPROMs), EPROM, MRAM, FRAM ferroelectric and magnetic memories. Note that the storage device may be implemented with any type of memory, whether flash memory or other type of memory.

Accordingly, the storage devices discussed herein may arranged for and be accessed via any of a variety of protocols such as secured digital ("SD") memory card format, multi media card ("MMC") format, compact flash ("CF") format, a flash PC (e.g., ATA Flash) format, a smart-media format, a USB flash drive, a memory stick format, or with any other standard format.

The host discussed herein may be a personal computer, a notebook computer, a hand held computing device, such as a PDA (Personal Digital Assistant) or mobile handset, a cellular telephone, a camera, an audio reproducing device, or any other electronic device that cooperates or may be adapted to cooperate with external data storage devices. A host may have various applications for accessing and using the content stored in the storage devices described above.

As will be appreciated, various embodiments can employ a wide variety of architectures and it is expected that new architectures will continue to be developed. In general, the exemplary embodiments may be employed in conjunction with any suitable type or number of storage devices, provided that a storage device being used has suitable interface connections and suitable storage capabilities.

Having described herein various embodiments of a hybrid storage, it is to be understood that the description is not meant as a limitation. Indeed, further modifications will now suggest themselves to those skilled in the art, and it is intended to cover such modifications as falling within the scope of the appended claims.

The invention claimed is:

1. A hybrid storage apparatus for retaining printed content and storing digital content, the hybrid storage apparatus comprising:

a loose-leaf ring binder including a front cover, a back cover, a spine connecting the front and back covers, and a plurality of rings configured to retain and release printed pages for containing the printed content generated by a user; and a storage device embedded within the spine, the storage device including:

a housing comprising a rectangular parallelepiped structure attached to an inner surface of the spine and extending through the rings of the ring binder, a socket port comprising a recess in a face of the rectangular parallelepiped structure configured to detachably connect to a cable, which cable is separate from the hybrid storage apparatus and used for communicating with a host, and a non-volatile memory located within the housing and coupled to the socket port and configured for storing digital content, at least some of the digital content items being digital versions of the printed content generated by the user and wherein the socket port is configured to communicate the digital versions of the printed content to the host via the cable.

2. The hybrid storage apparatus of claim 1, wherein the non-volatile memory is a solid-state memory.

3. The hybrid storage apparatus of claim 2, wherein the solid-state memory utilizes flash memory technology.

4. The hybrid storage apparatus of claim 2, wherein the solid-state memory utilizes antifuse memory technology.

5. The hybrid storage apparatus of claim 1, wherein the socket port is a USB female connector.

6. A hybrid storage apparatus for holding print media and for storing digital content, the hybrid storage apparatus comprising:

a plurality of pages for containing printed content generated by a user, the printed content including one of text, graphics, and photos generated by the user;

a ring binder including a front cover, a back cover, a spine for connecting the front and back covers, and a plurality of rings for retaining and releasing the plurality of pages;

a storage device embedded within the spine, the storage device including:

a housing comprising a rectangular parallelepiped structure attached to an inner surface of the spine and extending through the rings of the ring binder, a socket port comprising a recess in a face of the rectangular parallelepiped structure configured to be detachably connected with a cable, which is separate from the hybrid storage apparatus and is used for communicating with a host, and a non-volatile memory located within the housing and coupled to the socket port and for storing a plurality of digital content items, at least some of the digital content items being digital versions of the printed content generated by the user and wherein the socket port is configured to communicate the digital versions of the printed content to the host via the cable.

7. The hybrid storage apparatus of claim 6, wherein the digital content items include digital pictures.

8. The hybrid storage apparatus of claim 6, wherein the digital content items include at least one video, and the table of contents includes at least one storyboard referring to each of said at least one video.

9. The hybrid storage apparatus of claim 6, wherein the non-volatile memory is a solid-state memory.

10. The hybrid storage apparatus of claim 9, wherein the solid-state memory utilizes flash memory technology.

11. The hybrid storage apparatus of claim 9, wherein the solid-state memory utilizes anti-fuse memory technology.

12. The hybrid storage apparatus of claim 6, wherein the socket port is a USB female connector.

13. The hybrid storage apparatus of claim 1 comprising a hub for connecting to the cable and communicating the digital content items from the non-volatile memory to the host, wherein the hub is capable of simultaneously connecting to a plurality of said hybrid storage apparatuses.

14. The hybrid storage apparatus of claim 6 comprising a hub for connecting to the cable and communicating the digital content items from the non-volatile memory to the host, wherein the hub is capable of simultaneously connecting to a plurality of said hybrid storage apparatuses.

15. A method for hybrid storage of documents, the method comprising:

storing printed versions of content generated by a user on pages and retaining the pages in a ring binder including a front cover, a back cover, a spine connecting the front and back covers, and a plurality of rings for retaining and releasing the pages;

storing digital versions of the content on the pages in the ring binder in a storage device embedded within the spine, the storage device including a housing comprising a rectangular parallelepiped structure attached to an inner surface of the spine and extending through the rings of the ring binder, a socket port comprising a recess in a face of the rectangular parallelepiped structure and configured to detachably connect to a cable and a non-volatile memory located within the housing for storing the digital versions of the content items, wherein the cable is separate from the storage device and used for communicating digital content from the non-volatile memory device to a host; and communicating the digital versions of the printed content from the non-volatile memory to the host via the cable.

* * * * *